United States Patent Office 3,405,695
Patented Oct. 15, 1968

3,405,695
ROTARY COMBUSTION ENGINE AND
ROTOR THEREFOR
Charles Jones, Hillsdale, and Marshall W. Galliers, Glen Rock, N.J., assignors to Curtiss-Wright Corporation, a corporation of Delaware
Filed Dec. 12, 1966, Ser. No. 600,964
8 Claims. (Cl. 123—8)

ABSTRACT OF THE DISCLOSURE

A rotary engine of epitrochoidal type, in which the radial extent of the polygonal rotor is progressively reduced from the leading portion of each working face to its trailing portion, in order to alter the proportions of the trailing end of the combustion chamber and reduce the quenching action of the chamber walls.

---

This invention relates to rotary combustion engines of the epitrochoidal type, and more particularly to a method and means for securing better combustion and reducing the proportion of unburned hydrocarbons released to atmosphere in the exhaust.

The combustion chamber of the epitrochoidal engine has an axial length fixed by the spacing of the end walls between which the rotor turns, and its volume is varied by cyclical variations in the distance between the working face of the rotor and the inner surface of the peripheral wall. This means that the chamber is essentially rectangular in cross-section as viewed transversely to the axis, and at certain portions of the cycle the rectangular section becomes proportionately very long and thin, but with the chamber having considerable extent in the peripheral direction. Thus there is produced a chamber portion in which the confining boundaries have a very large proportion of surface area to the volume of the chamber, or a local quench zone.

Such a configuration occurs particularly in the trailing portion of the chamber shortly after ignition is initiated. At that portion of the cycle the flame front does not readily travel backward in the direction opposed to rotor rotation, to the trailing portion of the chamber, and there is a tendency of the large wall surface to quench combustion in that area. The result of such quenching is that the vaporized fuel in the trailing chamber portion is cooled down below combustion temperature or may condense and deposit on the walls, is then swept along by the sealing system, and is finally discharged in the unburned state with the exhaust.

The peculiarly flat configuration of the combustion chamber at a quench zone is brought about by the necessary epitrochoidal shape of the peripheral housing wall, and the approach of the trailing portion of the rotor working face to parallelism therewith shortly before crossing the cusp of the epitrochoid just after combustion is initiated and while there is still a considerable quantity of unignited fuel mixture in the chamber.

Since the epitrochoidal shape of the peripheral wall is fixed, the present invention solves the problem by modifying the generally polygonal profile of the rotor in the region of the trailing apexes to provide in those portions a more open chamber shape without altering the compression ratio.

It is therefore a primary object of this invention to provide a method and means of improving combustion efficiency in an epitrochoidal engine.

It is another object to reduce the proportion of unburned hydrocarbons emitted in the exhaust of an epitrochoidal engine.

A further object is to approach complete combustion in the trailing portion of the chamber of the engine.

Still another object is to provide a rotor having an improved shape with regard to the efficiency of the engine.

Other objects and advantages will become apparent on reading the following specification in connection with the annexed drawings, in which.

Figure 1:
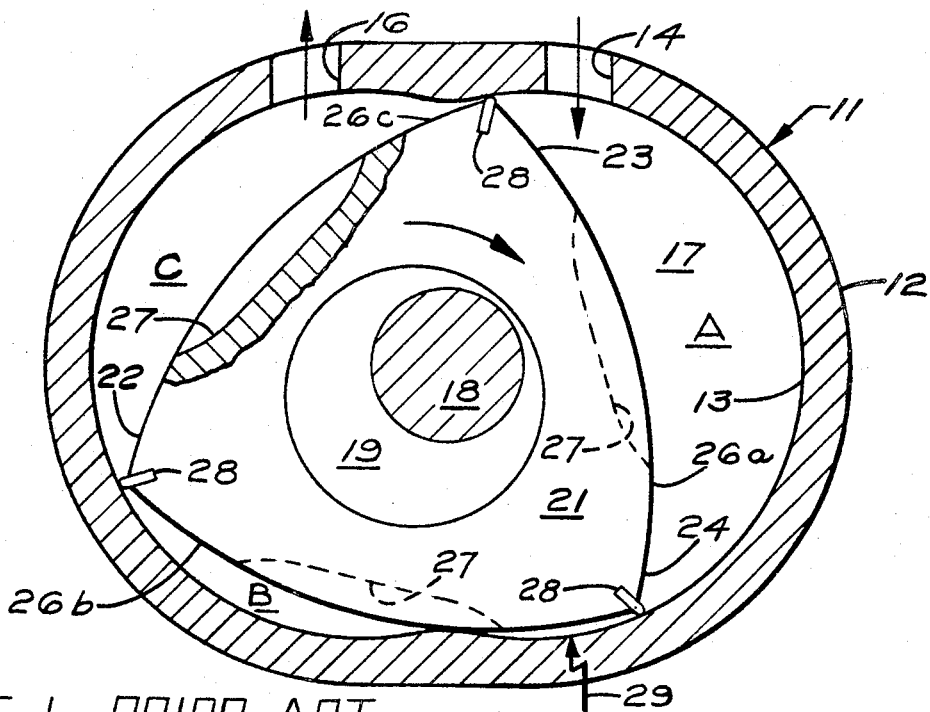
FIG. 1 is a cross-sectional elevation of a prior art engine, looking in the axial direction.

FIG. 1 shows a prior art engine 11, demonstrating the quenching action of the rotor and peripheral wall at a certain portion of the combustion cycle. There is shown a peripheral housing 12 having a two-lobed basically epitrochoidal inner surface 13, an inlet port 14, and an exhaust port 16. End walls 17 (of which only one is shown) are provided to complete the outer body. A shaft 18 transpierces the end walls on the outer body axis and bears within the cavity of the outer body an eccentric portion 19 on which is rotatably mounted a generally polygonal rotor 21 having parallel end faces and three apex portions 22, 23 and 24 with convexely arcuate working faces 26a, 26b and 26c extending between adjacent apex portions.

Such a rotor of the prior art has a profile in the axial direction which approximates the inner envelope of the epitrochoidal housing within which it operates. A trough-like cutout or recess 27 is provided in each rotor working face to transfer gases across the cusp of the epitrochoid. An apex seal member 28 is mounted in a groove at each apex of the rotor, sweeping the epitrochoidal inner surface in sealing relation therewith and isolating from each other the three variable-volume working chambers, A, B and C defined by the outer body and the rotor. A sparkplug is schematically indicated by the arrow 29.

The engine so far described is well known in the art, and there have been omitted from the drawings and description such ancillary elements as oil seal, bearings, seal springs, and so forth which are not directly related to the present invention.

In FIG. 1 chamber A is intaking, chamber C is exhausing and chamber B is in the process of combustion and expansion. Each chamber is normally fired shortly before the rotor working face reaches dead center. As shown in the drawing, the rotor has turned in the direction indicated by the arrow approximately 30° after ignition, whereupon the trailing portion of the rotor working face 26b, near apex 24, has reached a position of near-parallelism with the peripheral wall, shortly before the trailing apex 24 crosses the cusp of the epitrochoid, producing a quench zone in the trailing portion of chamber B.

As will be seen from the drawing, although this trailing portion of the working chamber is in communication with the forward portion through cutout 27, and thus theoretically exposed to the flame of combustion, such trailing portion is bounded by walls in very close juxtaposition, that is, the trailing portion of the working face and the peripheral housing. These relatively cold metallic portions have therefore quenched the flame in the trailing portion of the chamber, and the inducted mixture in that portion is cooled or condenses on the walls and is swept around and out the exhaust by the trailing seal member 28.

Figure 2:
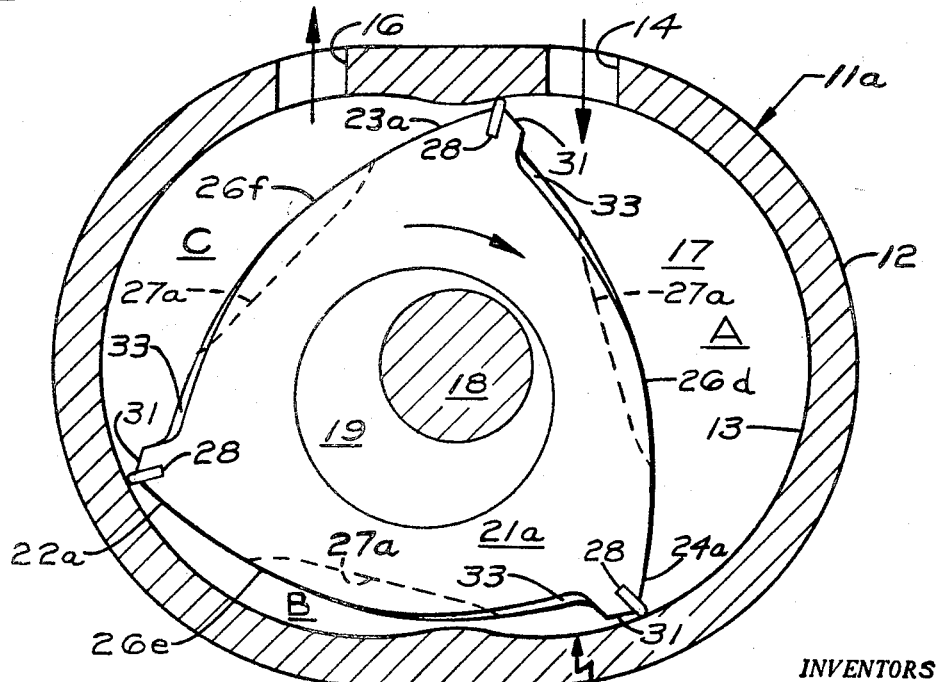
FIG. 2 is a similar view of an engine modified according to the present invention.
Figure 3:
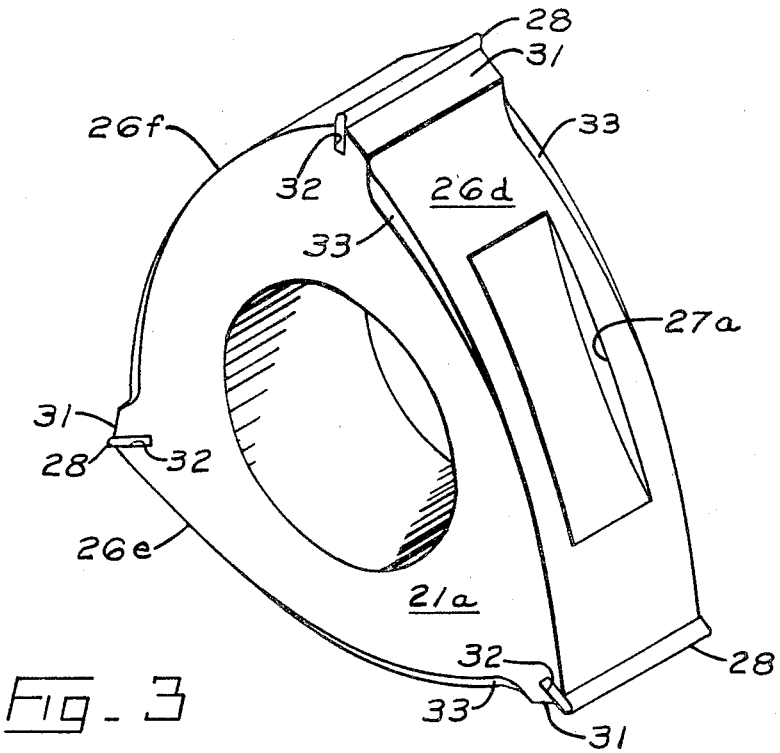
FIG. 3 is a perspective view of the rotor of the invention.
Figure 4:
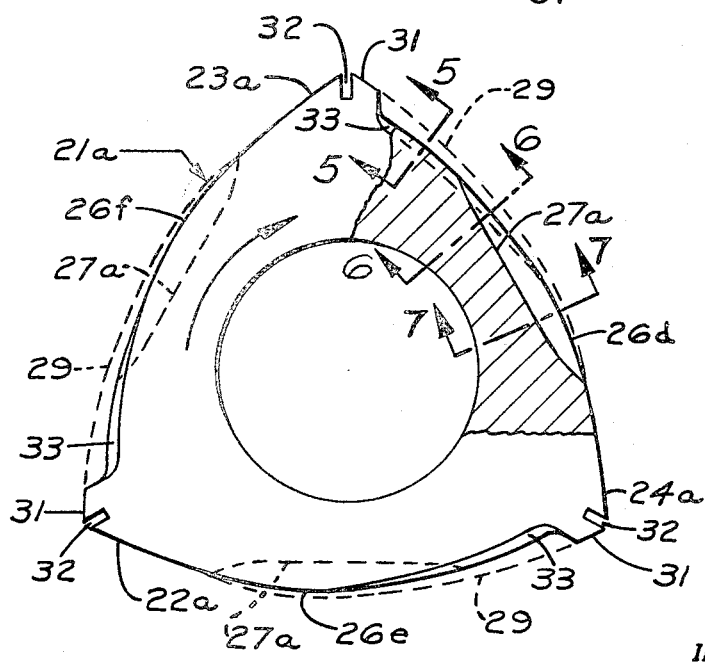
FIG. 4 is an elevation, partly in section, of the rotor of the invention.

FIG. 2 shows the improved engine 11a of the invention, embodying the new rotor 21a in combination with the other elements of the engine which are unchanged.

The improved rotor 21a is best shown in FIGS. 3–7. It differs from rotors of the prior art in that its generally polygonal axial profile is not that of the approximate inner envelope of the epitrochoid. Instead, each of the working faces 26d, 26e and 26f is progressively cut back or displaced radially inwardly from the inner envelope, along a smooth curve toward the trailing apex of each working face. The leading portion of a working face lies approximately on the profile of the inner envelope for about one-fourth of the distance from its leading apex, then the radial distance of the working face from the rotor center is progressively diminished below the radial distance of the inner envelope curve 29 (shown in dotted line in FIG. 4) to a point near the trailing apex, whereupon the working face is faired on a smooth curve radially outward to leave a short land 31 adjacent to the seal slot 32, which land has a surface again approximately coincident with the inner envelope curve 29. Such lands 31 are provided to leave a reasonable thickness of metal supporting the seals 28 to be installed in grooves 32 in the assembled engine.

Each of the working faces of the improved rotor 21a is further modified by having each of its corners at the junction with the parallel rotor end faces beveled or chamfered in the trailing portion. These chamfers 33 begin at approximately the midportion of each working face, and progressively deepen toward the trailing portion, being faired out at their trailing ends to lands 31.

Figure 5:
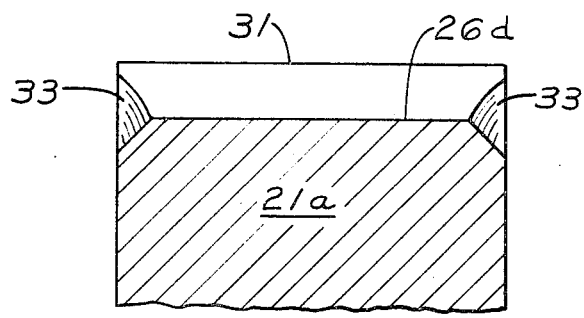
FIGS. 5, 6 and 7 are fragmentary cross-sections taken on the similarly numbered section lines of FIG. 4.
Figure 6:
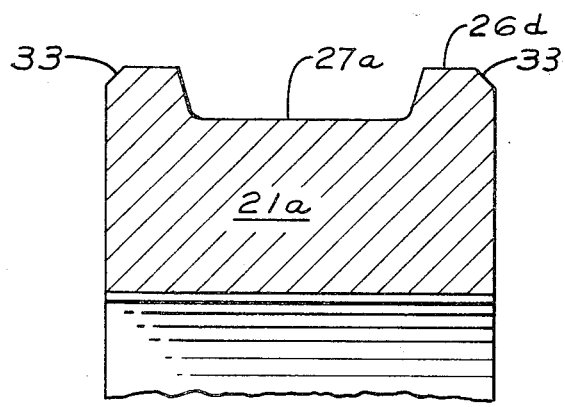
Figure 7:
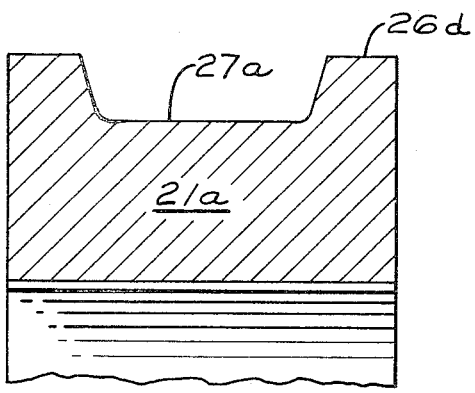

Such variation in the depth of chamfers 33 is shown in FIGS. 5–7. FIG. 5 is a fragmentary section taken toward the trailing end of working face 26d. Chamfers 33 on both corners of the working face are shown at their deepest, fairing out to land 31, FIG. 6 is a similar section taken forwardly of FIG. 5, showing chamfers 33 of less depth, and FIG. 7 still further forwardly, so that the chamfers do not appear.

In FIG. 2 there is shown an assembled engine, with the improved rotor 21a in cooperation with its housing at the same point in the operating cycle as the prior art engine shown in FIG. 1. Rotor 21a has turned approximately 30° after firing in chamber B, with trailing apex 24a in the same position as before. It will be apparent that with the modified rotor 21a the trailing portion of chamber B has been opened up so that working face 26e does not so closely approach the inner surface 13 of the epitrochoidal housing 12 as was the case in FIG. 1 wherein the work faces lie approximately along the inner envolpe curve. Thus there is prevented the former quenching action in the trailing portions of the working chambers A, B and C.

The compression ratio of such an engine is normally controlled or altered by the configuration of the rotor recesses 27. To lower the compression ratio of the engine shown in FIG. 1, recesses 27 may be either deepened, widened or lengthened, or any combination of the three, in order to increase the volume of the combustion chamber. Assuming that it is is desired in the modified engine 11a to maintain the same compression ratio as previously, recesses 27a in the improved rotor 21a have been made slightly shallower than recesses 27 in rotor 21, in order that the total volume of the combustion chamber will not be increased despite the increased volume of its trailing portion. However, if it should be desired, it is possible with the improved rotor of the invention to reduce the engine compression by keeping the rotor recesses the same size as formerly, thus increasing the total volume of the combustion chamber by the amount provided by modifying the trailing portion of the rotor working faces.

With the rotor of the invention, having the trailing portions of its working faces relieved so that they do not closely approach parallelism with the housing wall, and with the consequent enlargement of the trailing portion of the combustion chambers and elimination or reduction of the local quench zone, the former quenching action is prevented. Therefore, there is no residual fuel vapor remaining in the trailing chamber portion, or condensed and deposited on the chamber walls, in either case to be swept out the exhaust port discharge to atmosphere.

Although the invention has been described above in a preferred embodiment, it will be apparent to those skilled in the art that various changes and modifications can be made without departing from the scope of the invention. Among such changes would be variations in the length of the portion of the working face reduced from the approximate inner envelope; variations in the radial depth of such reduction; changes in angle, length, or depth of chamfer of the edges of the working faces; and changes in the depth, width, or length of the rotor recesses. It is intended to cover all such variations by the appended claims.

What is claimed is:

1. A rotary combustion engine comprising in combination:
    (a) an outer body having a pair of spaced end walls and a peripheral wall disposed between the end walls to form a cavity therebetween having an axis along which said end walls are spaced, the inner surface of said peripheral wall having a multilobed profile of basically epitrocoidal outline having a cusp at each junction of the lobes of said peripheral wall;
    (b) a shaft transpiercing said end walls coaxially with said outer body cavity and having an eccentric portion disposed within said cavity;
    (c) a rotor journaled on said eccentric portion for rotation within said cavity;
    (d) said rotor having a generally polygonal profile with a plurality of apex portions and having a plurality of working faces each extending between two adjacent apexes and bounded axially by the end faces of the rotor, said working faces defining with said outer body a plurality of variable-volume working chambers;
    (e) each of said working faces having a leading portion in the direction of rotor rotation and a trailing portion opposite thereto;
    (f) each of said leading portions extending about one-fourth of the peripheral dimension of its working face and having a curvature approximately congruent with the inner envelope of said epitrochoid, the remainder of said working face in the direction toward said trailing portion being progressively displaced further radially inwardly along a smooth curve so that the trailing portion of each of said working faces is disposed radially inwardly of the curve of the inner envelope of said epitrochoid, whereby during rotor rotation the trailing portion of each of said working faces will pass the cusp of the epitrochoid at a greater distance than the leading portion.

2. The combination recited in claim 1, wherein each of said rotor working faces is chamfered at each edge in the trailing portion thereof.

3. The combination recited in claim 2, wherein said chamfering begins approximately midway of said rotor working face between the two said bounding apexes, and becomes progressively greater toward said trailing portion of said working face.

4. The combination recited in claim 3, wherein each of said rotor working faces has a land at the trailing apex portion approximately coincident with the inner envelope curve.

5. A rotor for a rotary combustion engine having a peripheral housing with an inner surface basically in the shape of a multilobed epitrochoid:
    (a) said rotor having parallel end faces and a generally polygonal profile and having a plurality of apex portions and having a plurality of working faces each bounded by said end faces and two adjacent apexes;
    (b) each of said working faces having a leading portion and a trailing portion;

(c) each of said leading portions extending about one-fourth of the peripheral dimension of its working face and having a curvature approximately congruent with the inner envelope of said epitrochoid, the remainder of said working face in the direction toward said trailing portion being progressively displaced further radially inwardly along a smooth curve so that the trailing portion of each of said working faces is disposed radially inwardly of the curve of the inner envelope of said epitrochoid.

6. A rotor as recited in claim 5, wherein each of said working faces is chamfered at each edge in the trailing portion thereof.

7. A rotor as recited in claim 6, wherein said chamfering begins approximately midway between the two said bounding apexes, and becomes progressively greater toward said trailing portion of said working face.

8. A rotor as recited in claim 7, wherein each of said working faces has a land at the trailing apex portion approximately coincident with the inner envelope curve.

References Cited

UNITED STATES PATENTS

| | | | |
|---|---|---|---|
| 3,081,753 | 3/1963 | Hurley | 123—8 |
| 3,196,852 | 7/1965 | Bentele | 123—8 |

RALPH D. BLAKESLEE, *Primary Examiner.*